A. W. CROUCH.
WIND SHIELD.
APPLICATION FILED OCT. 16, 1914.

1,170,880.

Patented Feb. 8, 1916.
2 SHEETS—SHEET 1.

Witnesses
O. M. Wernich
Hazel A. Jones

Inventor
Albert W. Crouch
by Max W. Zabel atty.

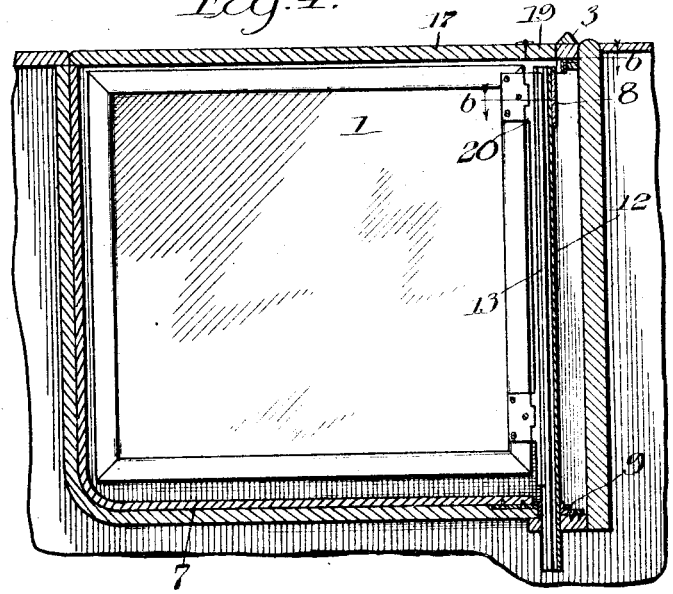
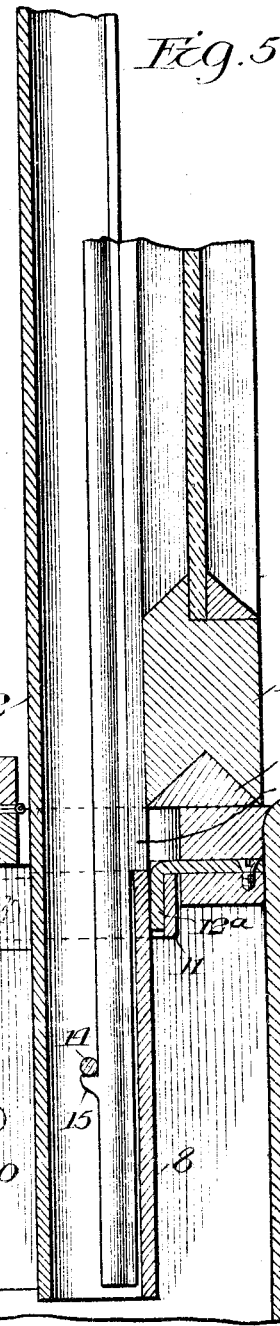
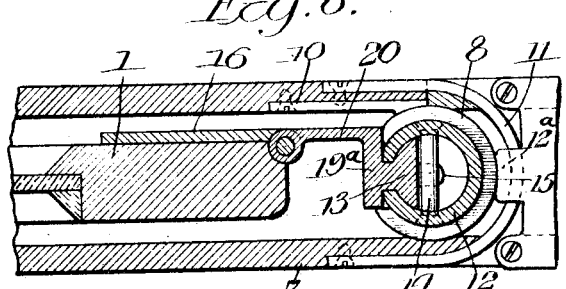
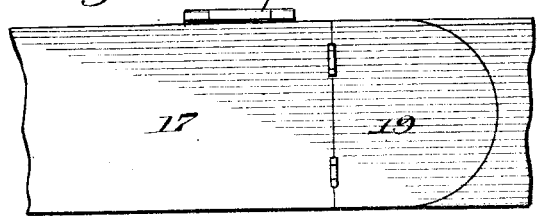

UNITED STATES PATENT OFFICE.

ALBERT W. CROUCH, OF MILWAUKEE, WISCONSIN, ASSIGNOR TO MILWAUKEE YACHT & BOAT COMPANY, OF MILWAUKEE, WISCONSIN.

WIND-SHIELD.

1,170,880.

Specification of Letters Patent.

Patented Feb. 8, 1916.

Application filed October 16, 1914. Serial No. 866,950.

*To all whom it may concern:*

Be it known that I, ALBERT W. CROUCH, a citizen of the United States, residing at Milwaukee, in the county of Milwaukee and State of Wisconsin, have invented a certain new and useful Improvement in Wind-Shields, of which the following is a full, clear, concise, and exact description, reference being had to the accompanying drawings, forming a part of this specification.

My invention relates to wind shields and is more particularly an improvement over my co-pending application Serial No. 818,849, filed Feb. 16, 1914. In my said co-pending application I disclose a disappearing wind shield.

My present invention herein is designed to provide a disappearing wind shield for automobiles or similar conveyances in which the wind shield is mounted in connection with a door, the door having provision to accommodate the wind shield when in its disappearing position.

In the preferred form of the invention I arrange the wind shield in two halves mounted at the opposite sides of the vehicle so that the wind shield may be swung about its pivot and the adjoining ends fastened together when in its active position. When the wind shield is to be removed, the two halves are swung about their pivots and dropped into compartments, one or more of which compartments may be carried by a swinging door. I will explain this form of carrying out my invention more in detail by referring to the accompanying drawings in which—

Figure 1:
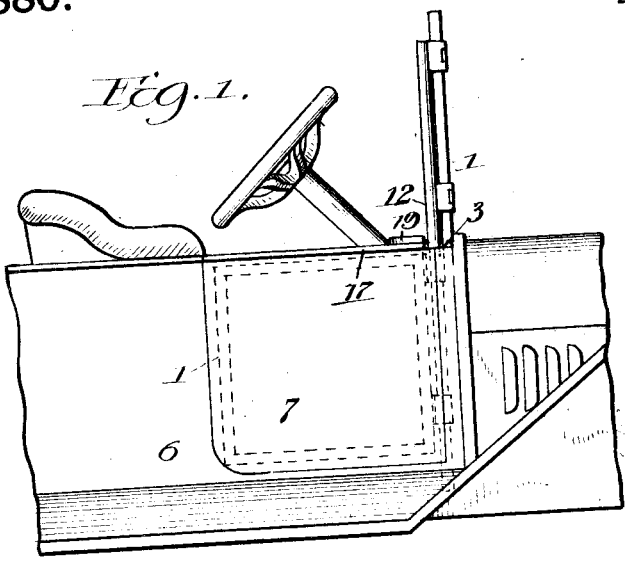
Figure 2:
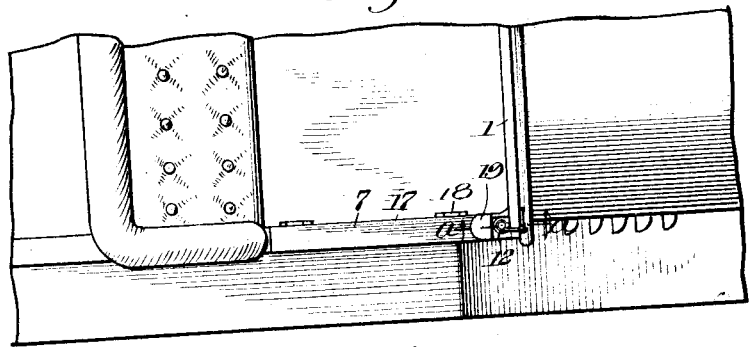
Figure 3:
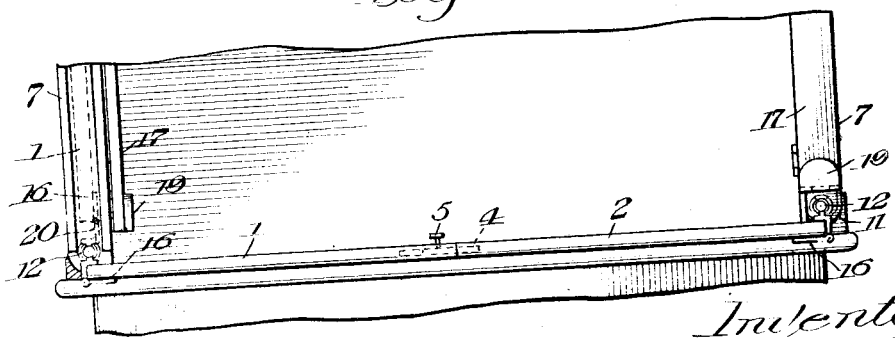

Figure 1 is a side view of an automobile having the wind shield of my invention in its active position, showing in dotted lines its disappearing position; Fig. 2 is a top fragmentary view of the structure outlined in Fig. 1; Fig. 3 is a fragmentary top view somewhat similar to Fig. 2 showing the means for holding the two adjoining ends of the wind shield together; Fig. 4 is a sectional view of a door showing the wind shield accommodated therein; Fig. 5 is an enlarged detail sectional view on line *a—a* of Fig. 2; Fig. 6 is a sectional view on line *b—b* of Fig. 4, and Fig. 7 is a top view of the door showing the hinged cover plate.

My improved wind shield is designed to be constructed preferably of two halves 1 and 2, which when in their active position as shown more clearly in Fig. 5 rest on top of a pyramidal ridge 3. The lower portions of the framework of the wind shield are grooved to set on top of this ridge so as to hold the shield in its active position. In addition to this supporting structure a bolt 4 having the finger piece 5 is provided which is mounted in the framework of the wind shield section 1 and is adapted to be pushed into an aperture of the section 2 as shown more clearly in Fig. 3 to thereby more thoroughly prevent displacement of the wind shield when in its active position. I have shown an automobile body 6 to which the wind shield is applied, this body being shown as having doors 7, 7. Of course it can be readily seen that under certain conditions that only one door need be used and I do not wish to be limited to the use of two doors in this particular structure. The doors 7 are pivotally mounted as will presently appear and are hollow so that they can accommodate within their interior the wind shield sections 1 and 2 respectively. These wind shield sections are pivotally supported within the door, being pivoted about the same axis that the door is pivoted, thus to permit opening and closing of the door irrespective of whether the wind shield is in its active position or not. The hollow door carries a cylindrical tube 8 fastened thereto through the agency of the plate 9 and screws 10. This cylindrical tube preferably extends below the door as shown more clearly in Fig. 4 and is pivotally mounted within a plate 9 fixedly secured in the framework of the vehicle, the elements 8 and 9 providing the lower pivotal mounting for the door. The door is pivotally mounted at its upper extremity by having a circular strap 11 into which a depending finger 12ª extends as shown more clearly in Figs. 5 and 6. The depending finger of course is adapted to slide in the annular recess provided between the elements 11 and 8 as more clearly apparent from Fig. 6. The wind shield sections preferably have similar pivotal and disappearing mountings, and I will therefore explain the pivotal mounting of the section 1 as being applicable to the two sections.

The tube 8 which is fastened within the door rotatably carries a split cylindrical tube 12. This split cylindrical tube may be rotated as stated within the tube 8 and may also be raised or lowered, the two elements 8 and 12, thus being telescopic in character. A strip 13 having a cross-section as shown more clearly in Fig. 6 is slidably mounted within the tube 12 and is prevented from rotation relative to said tube by the bar 14, the two members 13 and 12 thus being telescopic relative to each other. The element 13 also has near its lower extremity a catch 15 adapted to engage the bar 14 so that when the strip 13 is elevated sufficiently it draws the tube 12 upwardly with it when in its further upward movement. The wind shield section 1 is pivoted to the strip 13 by the hinge plate 16. When the wind shield is in its disappearing position the top of the door is closed by the cover plate 17 hinged at 18 carrying a supplemental flap 19.

Assuming now that the wind shield is to be moved from its disappearing position of Fig. 4 to its active position of Figs. 1 or 5, then the wind shield section 1 is elevated by having the element 13 slide within the tube 12 until the catch 15 engages the bar 14, whereafter upon further upward movement of the section 1 the tube 12 also slides upwardly relatively to the fixed tube 8. After the wind shield section has been elevated sufficiently to clear the ridge 3 it is swung about its axis by the relative movement between these elements 8 and 12 and moved upon the ridge 3. In this position it will be seen that the wind shield section extends slightly above the tube member 12 as shown more clearly in Fig. 1. The bolt 4 is then slid into place and the wind shield sections present a continuous barrier across the front of the vehicle. In this position it will be noted that the flap 19 of course remains open. It will also be noted that the door can be opened and closed even though the wind shield is in its active position as relative rotative movements between the elements 8 and 12 is permitted when the wind shield is in such active position.

It is of course readily seen from Fig. 5 that the angular portion 19ᵃ of the strip 13 does not extend into the element 8 when the wind shield is in its active position, thus permitting of the relative rotation as stated. It is further to be noted more clearly by an inspection of Figs. 3 and 6 that those extremities of the sections at which these sections are pivoted are also quite rigidly held in position by resting within the rectangular portions 20 of the strip 13.

From what has been described the nature of my invention will be clear to those skilled in the art.

Having however thus described one form which my invention may take, what I claim as new and desire to secure by Letters Patent is:

1. Apparatus of the character described comprising a pivotally mounted door having a pocket, a wind shield having a pivotal mounting substantially concentric with the pivotal mounting of said door and slidable into and out of the pocket in said door, said wind shield when in operative position by virtue of its pivotal mounting being substantially at right angles to said door.

2. Apparatus of the character described comprising a pivotally mounted door having a pocket, a wind shield, means whereby said wind shield may be slid into and out of said pocket, and means for pivotally carrying said wind shield so that said wind shield may be swung at an angle to said door when said wind shield is to occupy its operative position.

3. Apparatus of the character described comprising a pivotally mounted door having a pocket, a wind shield having a pivotal mounting substantially concentric with the pivotal mounting of said door, means whereby said wind shield may be slid into and out of the pocket in said door, said wind shield when in its operative position outside of said pocket being adapted to be swung about its pivotal mounting at an angle to said door.

4. Apparatus of the character described comprising a door having a pocket, a wind shield, means for concentrically pivotally mounting said door and wind shield, and means whereby said wind shield may be slid into and out of said pocket, said wind shield when in operative position by virtue of its pivotal mounting being adapted to be swung at an angle to said door.

5. Apparatus of the character described comprising a door having a pocket, a wind shield, means for concentrically pivotally mounting said door and wind shield, and means whereby said wind shield may be slid into and out of said pocket, said wind shield when in operative position by virtue of its pivotal mounting being adapted to be swung at an angle to said door, and to maintain said position without interfering with the swinging of said door.

In witness whereof, I hereunto subscribe my name this 7th day of October, A. D. 1914.

ALBERT W. CROUCH.

Witnesses:
A. G. JAEGER,
JAS. B. WELCH.